United States Patent
Witt et al.

[11] Patent Number: 6,026,962
[45] Date of Patent: Feb. 22, 2000

[54] BAG FOR STORING AND DISPENSING ELECTRICAL CORD

[75] Inventors: Jerome M. Witt; Benjamin R. Groeser, both of Yuba City, Calif.; Morse L. Roberts, Sparks, Nev.

[73] Assignee: Liberty Tool, LLC, Yuba City, Calif.

[*] Notice: Under 35 U.S.C. 154(b), the term of this patent shall be extended for 78 days.

[21] Appl. No.: 08/665,162

[22] Filed: Jun. 14, 1996

[51] Int. Cl.⁷ .................................................. B65D 85/04
[52] U.S. Cl. .............................. 206/702; 383/33; 383/119
[58] Field of Search .................................. 206/702, 388; 220/9.1; 383/119, 105, 33, 35; 174/135

[56] References Cited

U.S. PATENT DOCUMENTS

| | | | |
|---|---|---|---|
| 2,425,683 | 8/1947 | Martin | 383/122 |
| 3,327,924 | 6/1967 | Brutting | 383/119 |
| 4,290,468 | 9/1981 | Rosenbloom, Jr. et al. | 220/9.1 |
| 4,662,517 | 5/1987 | Wirth | 206/388 |
| 4,688,674 | 8/1987 | Stirtz | 206/388 |
| 4,713,033 | 12/1987 | Cameron | 441/84 |
| 4,984,685 | 1/1991 | Douglas | 206/702 |
| 5,103,977 | 4/1992 | Douglas | 206/702 |
| 5,174,450 | 12/1992 | Upchurch | 206/39.1 |
| 5,439,109 | 8/1995 | McBride | 174/135 |
| 5,449,067 | 9/1995 | Cannon | 206/702 |

OTHER PUBLICATIONS

Bob & Bob, Catalog, Dec. 1995, p. 8.
Feather River Mountaineering, Press Release, May 2, 1996, 1 page.

*Primary Examiner*—Paul T. Sewell
*Assistant Examiner*—Luan K. Bui
*Attorney, Agent, or Firm*—Arthur J. Behiel

[57] ABSTRACT

A bag for storing and dispensing electrical cord includes a sidewall formed from a pliable sheet of material. The sidewall defines an interior compartment having an open end, a closed end, and a central portion defined between the two ends. The central portion of the interior compartment is supported by a resilient ring having sufficient stiffness to maintain the interior compartment in an at least partially uncollapsed shape when the bag lies on its side. An electrical cord is stored within the interior compartment with one end of the cord protruding through an aperture in the closed end and the other end of the cord protruding from the open end of the compartment.

11 Claims, 1 Drawing Sheet

BAG FOR STORING AND DISPENSING ELECTRICAL CORD

BACKGROUND

Field of the Invention

The present invention relates to devices used to store and dispense cord, and in particular to devices used to store and dispense electrical cord.

Discussion of Related Art

Many devices are currently available for storing and dispensing electrical cord. Among them, probably the most common type is a simple frame around which a user manually wraps a cord. Unfortunately, such frames are cumbersome, especially for long cords. Moreover, such frames can impose sharp bends in the cord that may damage the cord.

Other common cord storage devices include a spindle around which the cord is coiled. Some of these spindle-type devices automatically rewind the cord. However, such devices are typically either too fragile for heavy use or are expensive. In addition, when only a portion of a cord is used, air flow is inhibited around the remaining tightly coiled portion. As a result, heat may build up within the coiled portion, particularly when the cord is conducting a relatively high level of current. Heat build-up is problematic because it decreases the operating efficiency (i.e., increases the resistance) of the cord, reduces cord life, and can present a fire hazard.

Due to the aforementioned problems of the prior art, there exists a need for a simple, inexpensive cord storage and dispensing device that allows a cord to remain relatively cool under heavy use.

SUMMARY

The present invention is directed to a bag for storing and dispensing electrical cord. The inventive bag includes a sidewall formed from a pliable sheet of material. The sidewall defines an interior compartment having an open end, a closed end, and a central portion defined between the two ends. The central portion of the interior compartment is supported by a resilient ring having sufficient stiffness to maintain the interior compartment in an at least partially uncollapsed shape when the bag lies on its side. An electrical cord is stored within the interior compartment with one end of the cord protruding through an aperture in the closed end and the other end of the cord protruding from the open end of the compartment.

This summary does not purport to define the invention. The invention is defined by the claims.

DETAILED DESCRIPTION

Figure 1:
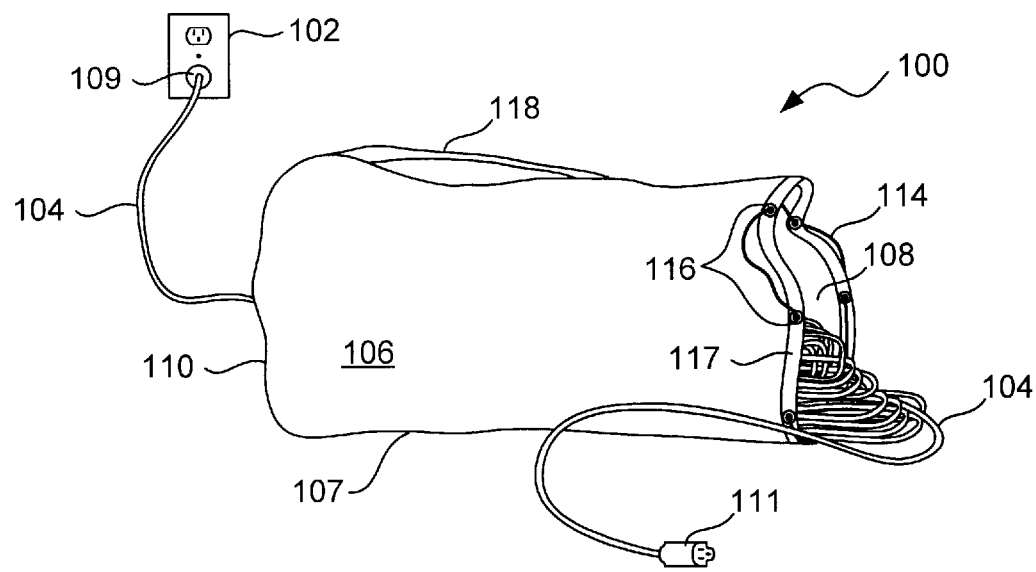
FIG. 1 shows a system 100 for providing electric power to a location remote from an electrical outlet 102.

FIG. 1 shows a system 100 for providing electric power to a location remote from an electrical outlet 102. The system includes an electrical cord 104 loosely stored within a generally cylindrical bag 106. Bag 106 includes a sidewall 107 formed from a pliable sheet of material. In one embodiment, sidewall 107 is formed from 600 denier vinyl-backed polyester. Other materials are also suitable, as will be apparent to those of skill in the art.

Cord 104 is placed within an interior compartment defined by bag 106 via an opening 108 in a first end of bag 106. Cord 104 includes a first connector 109 (typically male) that extends through an aperture (see FIG. 2) in an end cover 110 of bag 106 to be inserted into outlet 102. Cord 104 also includes a second connector 111 (typically female) that extends from opening 108. Cord 104 is typically stored within bag 106 so that connector 109 extends a short distance from opening 108. Bag 106 also includes a drawstring 114 threaded through a number of grommets 116 in a double-folded casing 117. Drawstring 114 is drawn tight to close opening 108, thereby securing cord 104 within bag 106. Thus configured, bag 106 and cord 104 are easily carried by a handle 118.

When a length of cord 104 is needed, drawstring 114 is released to enlarge opening 108. The desired length of cord 104 is then withdrawn, leaving any remaining length of cord 104 conveniently stored and out of the way, thereby reducing fire and trip hazards associated with unrestrained electrical cord.

Figure 2:
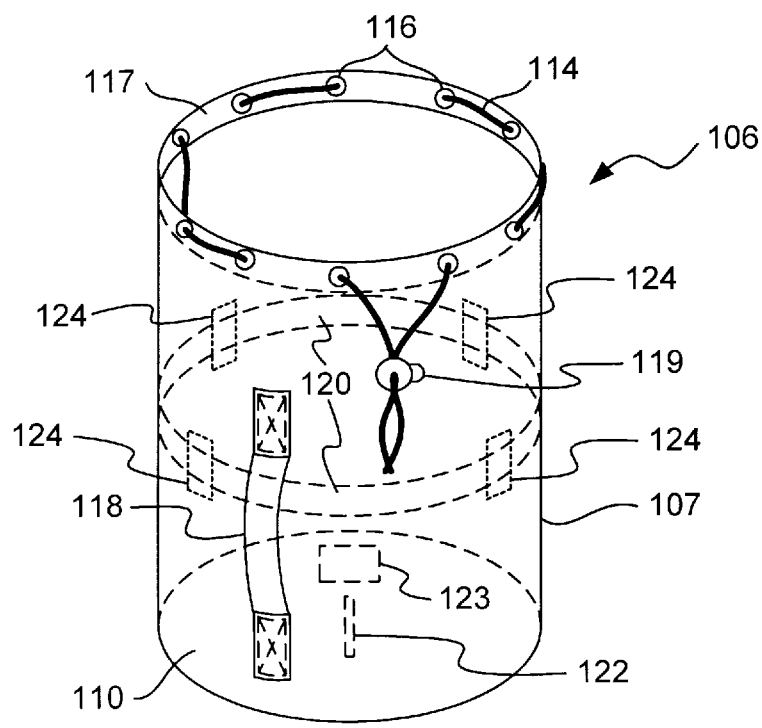
FIG. 2 is a schematic diagram of an embodiment of a bag 106.

FIG. 2 is a schematic diagram of an embodiment of bag 106. In addition to the features shown in FIG. 1, FIG. 2 includes a drawstring lock 119, an annular support 120, an aperture 122, and a cord-retaining element 123.

Drawstring lock 119 conventionally secures drawstring 114 to keep bag 106 closed. Aperture 122 is a slit in end cover 110 reinforced using conventional button-hole stitching. Cord-retaining element 123 secures the portion of cord 104 extending from aperture 122 to the surface of end cover 110, and is in one embodiment a Velcro tab. For ease of assembly and replacement, support 120 is affixed to sidewall 107 via four Velcro tabs 124. Support 120 may be affixed inside or outside the interior compartment defined by bag 106. In other embodiments, one or both of aperture 122 and cord-retaining element 123 are located elsewhere on bag 106 or are eliminated altogether.

As is well known, Velcro fasteners conventionally include two layers of synthetic fabric, a "hook" layer and a "loop" layer. These hook and loop layers adhere to one another when pressed together. Tabs 124 are formed by attaching (e.g., sewing) one Velcro layer, either the hook or the loop layer, to bag 106. Then, support 120 is sandwiched between the attached layer and the remaining layer. Because the hook and loop layers must contact one another for adhesion, the hook and loop layers of tabs 124 extend beyond the edges of support 120 to contact one another. Cord-retaining element 123, also a Velcro tab, is similarly configured to restrain cord 104.

Bag 106 is similar to conventional rope bags used by rescue teams and mountain climbers. However, conventional rope bags tend to collapse under their own weight. In contrast, bag 106 does not collapse when lying on sidewall 107. This is due, in part, to the material used to form sidewall 107. However, in the embodiment of FIG. 2 an annular support 120 is attached to sidewall 107 around a central portion of the interior compartment defined by bag 106. Support 120, in one embodiment a polycarbonate ring, is of sufficient stiffness to maintain the interior compartment in an at least partially uncollapsed shape when the bag lies on sidewall 107. Support 120 is also resilient enough to withstand repeated deformation. The polycarbonate used to form support 120 is available from General Electric under the trademark "Lexan."

Inhibiting the collapse of bag 106 is important for several reasons. First, keeping bag 106 from collapsing on cord 104 eases the extraction of cord 104. Second, the open inner compartment allows for free circulation of air between loops of cord, thereby preventing excessive heat from building up within bag 106 when electrical current is conducted via cord 104.

Although the present invention has been described in considerable detail with reference to certain versions, other versions are possible. For example, while bag 106 is described above as storing and dispensing electrical cord, bag 106 is equally suitable for storing and dispensing other types of cord or rope. Hence, the scope of the appended claims is not limited to the description of the embodiments described above.

What is claimed is:

1. A bag comprising:
   a sidewall formed from a pliable sheet of material, the sheet formed to define an interior compartment having a first end, a second end, and a central portion defined between the first and second ends;
   an end cover formed integral with the sidewall and covering the second end of the interior compartment;
   a support attached to the sidewall around the central portion of the interior compartment, the support having sufficient stiffness to maintain the interior compartment in an at least partially uncollapsed shape when the bag lies on the sidewall; and
   a cord-retaining element attached to at least one of the sidewall or the end cover.

2. The bag of claim 1, wherein the interior compartment is configured to receive and store a length of cord.

3. The bag of claim 1, further comprising a handle affixed to the sidewall.

4. The bag of claim 1, wherein the first end is open to the interior compartment, and wherein the first end comprises a casing supporting a drawstring.

5. The bag of claim 1, wherein the end cover is formed of a second material different from the first-mentioned material.

6. A system comprising:
   a length of electrical cord having first and second connectors;
   a sidewall formed from a first pliable sheet of material, the sheet defining an interior compartment having first and second ends and a central portion defined between the first and second ends, the interior compartment configured to receive and store the electrical cord;
   an end cover formed integral with the sidewall and covering the second end of the interior compartment such that the sidewall and the end cover form a bag around the interior compartment; and
   a support attached to the sidewall around the central portion of the interior compartment, the support having sufficient stiffness to maintain the interior compartment in an at least partially uncollapsed shape when the system lies on the sidewall.

7. The bag of claim 6, wherein the end cover further comprises a cord retaining element for securing the cord to the end cover.

8. The bag of claim 6, further comprising a handle affixed to the sidewall.

9. The bag of claim 6, wherein the first end is open to the interior compartment, and wherein the first end comprises a casing supporting a drawstring.

10. The bag of claim 6, wherein the interior compartment is a cylinder defined by the first and second ends and by a circumference, and wherein the support is an annular member attached to the sidewall at the central portion of the bag and coincident with the circumference.

11. The bag of claim 6, wherein the end cover includes an aperture configured to allow passage of the cord.

* * * * *